United States Patent [19]
Baker et al.

[11] Patent Number: 6,017,573
[45] Date of Patent: Jan. 25, 2000

[54] PROCESS FOR PREPARING INTERMEDIATE MOISTURE PASTA PRODUCT

[75] Inventors: Janice M. Baker, New Milford, Conn.; Robert N. Greene; Tian Seng Toh, both of Singapore, Singapore; Elaine Regina Wedral, Sherman, Conn.

[73] Assignee: Nestec S.A., Vevey, Switzerland

[21] Appl. No.: 08/841,701

[22] Filed: Apr. 30, 1997

[51] Int. Cl.⁷ ........................................... A23L 1/162
[52] U.S. Cl. ............................................. 426/557; 426/451
[58] Field of Search ..................... 426/557, 516, 426/451, 94, 549, 805

[56] References Cited

U.S. PATENT DOCUMENTS

| | | | |
|---|---|---|---|
| 4,529,609 | 7/1985 | Gaehring et al. | 426/557 |
| 5,500,236 | 3/1996 | Miller et al. | 426/557 |
| 5,508,053 | 4/1996 | Villota et al. | 426/557 |
| 5,534,273 | 7/1996 | Ito et al. | 426/557 |
| 5,543,168 | 8/1996 | Yamasaki et al. | 426/557 |
| 5,573,796 | 11/1996 | Guarneri | 426/557 |
| 5,599,573 | 2/1997 | Barnes et al. | 426/557 |
| 5,759,608 | 6/1998 | Momiyama | 426/557 |

FOREIGN PATENT DOCUMENTS 57-036954A  2/1982  Japan.

OTHER PUBLICATIONS

Marilyn Bakker, The Wiley Encyclopedia of Packaging Technology, pp. 218–221. 1986.

*Primary Examiner*—Lien Tran
*Attorney, Agent, or Firm*—Pennie & Edmonds LLP

[57] ABSTRACT

A process of preparing an intermediate moisture pasta product having a moisture content of from 15 to 28% by preparing a dough containing an amount of a humectant to obtain a maximum water activity of 0.89 and an amount of alkali to increase the pH to about 11.5, sheeting or extruding the dough to give a fresh dough product, steaming the fresh dough product, and partially drying to a moisture content of from 15 to 28%.

17 Claims, No Drawings

PROCESS FOR PREPARING INTERMEDIATE MOISTURE PASTA PRODUCT

FIELD OF THE INVENTION

The present invention relates to the production of an intermediate moisture food, for example, to the production of an intermediate moisture pet food or a quick cooking shelf stable semi moist pasta.

BACKGROUND OF THE INVENTION

Conventional quick cooking pastas are produced by preparing pastas either in precooked, high moisture form (containing 55–70% moisture) or in dehydrated form (containing 5–12% moisture) with a thin or expanded structure for quicker rehydration in boiling water. The precooked, high moisture pasta has a poor shelf-life stability which is usually overcome by acidification and in-package pasteurization, while the dehydrated pasta has unsatisfactory textural quality.

Regular semi-moist pasta has a moisture content of about 15–45% and it has the advantage over dehydrated pasta that it requires only about half the cooking time even though the difference in moisture content is not great. The longer cooking time of the dehydrated pasta is due the hardening of the pasta surface of the dehydrated pasta during the drying step. In addition, semi-moist pasta has the advantage over high moisture pasta in that it is easier to preserve. Because of these two advantages, semi-moist pasta can be a convenient quick cooking product provided it has an extended shelf life.

The addition of salt and other humectants to the dough mix to preserve semi-moist pasta products has been described in the prior art. For example, U.S. Pat. No. 4,529,609 describes a method of preserving a semi-moist pasta by dispersing a finely divided salt throughout a dough, partially gelatinizing the salt-containing dough, then drying the gelatinized dough to a moisture content of at least 15% and a maximum water activity of 0.85. However, this patent states that if the product is packaged in a shelf stable form, a preservative should be included in the dough. U.S. Pat. No. 5,573,796 describes a method of producing a fresh pasta product (30–32% moisture) having an extended shelf life by incorporating up to 4% salt in the dough. Although adding salt to the dough is effective in preserving the pasta, it has the disadvantages of imparting a salty taste, and impairing the pasta texture.

We have found that by incorporating sodium chloride and/or another humectant into a dough to obtain a maximum water activity of 0.89 and an alkali to increase the pH to about 11.5, a shelf stable semi moist pasta or pet food is produced without including a preservative in the dough. The moisture content should be from about 15–28%.

SUMMARY OF THE INVENTION

According to the present invention there is provided a process of preparing an intermediate moisture food having a moisture content of from about 15 to 28% which comprises preparing a dough containing an amount of a humectant to obtain a maximum water activity of 0.89 and an amount of alkali to increase the pH to about 11.5, sheeting or extruding the dough to give a fresh dough product, steaming the fresh dough product, and partially drying to a moisture content of from about 15 to 28%.

The intermediate moisture product may be, for instance a semi-moist pasta or a dough-based pet food.

DETAILED DESCRIPTION OF THE INVENTION

When the intermediate moisture product is a semi-moist pasta, the pasta ingredients of the dough for preparing the fresh pasta may include a dry farinaceous ingredient and water, with or without one or more additives, to form a dough. The farinaceous ingredient may be one or more of durum semolina, durum flour, rice flour, buckwheat flour, regular wheat flour, whole wheat flour, farine flour, corn flour or starch material, or any mixture thereof depending on the type of pasta product desired. Generally, durum semolina is preferred for extruded pasta, such as spaghetti, macaroni, etc., while durum or wheat flour are preferred for sheeted pasta, such as noodles. The farinaceous ingredient is usually present in an amount of from about 75 to 85% of the dry ingredient mixture depending on the variety and particle size. The amount of water mixed with the farinaceous ingredient is normally from about 15 to 35% by weight based on the total weight of the dough. The temperature of the water mixed with the farinaceous ingredient may be from about 5° to 30° C. and more usually from about 10° to 25° C. The water used may be acid or alkaline and the pH is usually from about 6 to 7.

Wheat gluten is typically included in the dry ingredient mix at a level of about 2 to 20% by weight of the dry mix, with amounts between 5% and 10% being preferred, to increase the protein content of the pasta thereby increasing its strength and firmness. Dehydrated egg material such as dried egg white, dried eggs and dried yolks, for instance in the powder form, and/or liquid whole eggs, may if desired, be included in the ingredient mix at levels up to about 5.5% by weight for dry products and up to about 22% by weight for liquid products, based on the weight of the dry ingredient mix. Whole eggs and egg yolks generally are used in the production of noodles, while dried egg whites are generally used in the production of spaghetti. In addition, glyceryl monostearate may, if desired, also be included in the ingredient mix, particularly in the production of extruded pasta, to improve firmness, reduce stickiness and minimize absorption of water from the sauce component by the pasta. If used, the glyceryl monostearate preferably is present in amounts of from about 0.5 to 2% by weight of the dry ingredient mix. It is to be understood that wheat gluten, eggs, and glyceryl monostearate are optional ingredients in the dry mix and are not essential in the production of the pasta component. It is also advantageous to use propylene glycol alginate in the dry ingredient mix to obtain a pasta with an elastic and firm texture, preferably in an amount of from about 0.01 to 1.0% by weight based on the weight of the dry ingredient mix.

If desired, seasonings, spices or flavorings such as meat, chicken or beef flavors may be added to the pasta dough, e.g. in amounts of from about 0.1 to 5% by weight based on the total weight of the pasta.

The humectant that is incorporated in the dough should, of course, be edible and may be, for instance, sodium chloride, glycerol, sorbitol, etc. Mixtures of two or more humectants may be used if desired. The sodium chloride may be added in dry solid form, e.g. in finely divided form, such as a flour or powder, but preferably it is added in solution in the water, and mixed intimately with the dough ingredients. The amount of humectant used may be from about 1 to 10%, preferably from 2 to 7.5% and especially from 3 to 6% by weight based on the weight of the dough. More or less humectant may be used as desired. The water activity of the pasta is preferably below 0.89, for instance from about 0.6 to 0.85. For example, the water activity may be decreased from 0.92–0.93 to 0.86–0.87 with the addition of 2.5% salt and from 0.92–0.93 to 0.80–0.81 with the addition of 5% salt.

The alkali that is added to the dough to increase the pH to from about 8 to about 11.5 may be, for instance, sodium hydroxide, calcium carbonate, sodium carbonate, potassium carbonate or calcium hydroxide. The amount of alkali that is used may be from about 0.1 to 2.5% by weight based on the weight of the dough. In addition to achieving the required pH, the alkaline agents also achieve the desired pasta texture and the choice of alkaline agent and the amount used depend to some extent on the organoleptic requirement of the product. Advantageously, a buffer system may be incorporated into the dough to stabilize the pH values at the desired levels. Examples of buffer systems are sodium hexametaphosphate and sodium polyphosphate. The amount of buffer may be, for instance, up to 1% by weight based on the weight of the dough.

The dough may be formed into the fresh pasta under pressure by conventional methods such as sheeting, kneading or extrusion into a variety of pasta sizes and shapes, e.g. ravioli, spaghetti, macaroni, noodles and the like. The fresh pasta which is steamed may contain, for instance, from about 28 to 32% moisture and may be a sheeted pasta, a sheeted/slitted pasta, or an extruded pasta all of which may have been cut to the desired size.

The steaming of the fresh pasta may be carried out using saturated steam or steam at atmospheric condition, e.g. at a temperature from about 85° to 100° C. and conveniently from 95° to 100° C. for a period of from about 1 to 5 minutes, preferably from 1.5 to 3.5 minutes. The steaming cooks or gelatinizes at least part of the surface of the pasta, e.g. at least 50% and preferably substantially all the surface of the pasta.

The fresh steamed pasta may be advantageously a sheeted dough which may be used to prepare longitudinal type pastas such as fettucine, linguine or spaghetti by partial drying followed by slitting and cutting. Alternatively, the fresh steamed pasta may be an extruded dough having the shape of the desired product, e.g. rotini or elbow macaroni, which may be partially dried.

The partial drying of the pasta may be performed by means of an impingement, forced air drier, an oven tunnel or a hot air tunnel, e.g. at a temperature of from 80° to 110° C. over a period of from about 0.5 to 10 minutes, more usually from 2 to 7.5 minutes.

The pastas may packaged in suitable containers, e.g. food-grade packages, flexible plastics pouches, plastics or paperboard trays or glass jars. The packaging of the pasta in the container may be performed under modified atmospheric conditions is preferably carried out at ambient temperature. The modified atmosphere may comprise nitrogen or carbon dioxide or other inert gases either alone or any mixture thereof, e.g. a mixture of nitrogen and carbon dioxide as is conventionally used, e.g. a ratio of $N_2$ to $CO_2$ of 80:20, 65:35 or 50:50. Afterwards the package is sealed.

The intermediate moisture foods of this invention require no preservatives such as antimicrobial or antimycotic agents, and they may have a shelf life of from 6 months to a year or longer. No in-pack pasteurization is required. The shelf stable pastas have an excellent texture and taste as well as being of quick-cooking quality. If desired, the pastas may be refrigerated.

EXAMPLES

The following Example further illustrates the present invention. Parts and percentages are expressed by weight.

Example 1

A dough is prepared by mixing 73.66 parts soft wheat flour, 1.50 parts whole egg powder, 2.00 parts salt, 0.30 parts calcium hydroxide, 0.09 parts sodium carbonate, 0.05 parts potassium carbonate and 22.40 parts water. The dough is then sheeted to 1 mm thickness and steamed at 93° C. for 3 minutes in saturated steam. The dough sheet is then surface dried in an impingement, forced air drier at 104° C. for 4 minutes and 30 hertz air velocity. The pasta is slitted and cut to 2 mm width and 15 cm long, packaged with nitrogen and the package sealed.

The semi-moist pasta produced has a water activity ("Aw") of 0.87 and a pH of 10 and remained microbiologically stable for 1 month even when challenged with yeast, mold and *Staphylococcus aureus*.

Example 2

Dough of 30% moisture is prepared by mixing a dry mix containing 80% wheat flour, 15% amioca starch and 5% whole egg powder with an alkaline solution containing 78% water, 10% glycerol, 8% salt, 1% sodium carbonate, 1% potassium carbonate, 1% calcium hydroxide and 1% sodium polyphosphate. The dough is sheeted through a series of continuous rollers to achieve a final thickness of 2.0 mm and slitted into noodle strands having a width of 2.0 mm. The noodles are then steamed with saturated steam at 100° C. for 3 minutes, predried in a hot air tunnel at 100° C. for 3 minutes and cut into portions. The noodle portions are packed in a high oxygen barrier pouch with nitrogen flushing.

The noodles have a pH of 10 and an Aw of 0.86.

Example 3

A similar procedure to that described in Example 2 is followed but in the absence of calcium hydroxide, sheeted to achieve a final thickness of 1.0 mm and slitted into noodle strands having a width of 4 mm.

The noodles have a pH of 9.5 and an Aw of 0.86.

What is claimed is:

1. A process for preparing an intermediate moisture food having a moisture content of from about 15% to 28% which comprises preparing a dough containing a humectant in an amount of from 2% to 10% by weight based on the weight of the dough to obtain a maximum water activity of 0.89 and an alkali in an amount effective to impart a pH of about 8 to 11.5; sheeting or extruding the dough to provide a fresh pasta dough product; steaming the fresh pasta dough product; and partially drying the steamed product to form an intermediate moisture pasta product having a moisture content of from about 15% to 28%.

2. A process according to claim 1 wherein the humectant that is incorporated in the dough is sodium chloride, glycerol or sorbitol or a mixture of two or more of said humectants.

3. A process according to claim 2 wherein the sodium chloride is added in solution in the water, and mixed intimately with the dough ingredients.

4. A process according to claim 1 wherein the amount of humectant used is from about 1 to 10% by weight based on the weight of the dough.

5. A process according to claim 1 wherein the alkali is sodium hydroxide, calcium carbonate, sodium carbonate, potassium carbonate or calcium hydroxide.

6. A process according to claim 1 wherein the amount of alkali that is used is from about 0.1 to 2.5% by weight based on the weight of the dough.

7. A process according to claim 1 wherein a buffer system is incorporated into the dough to stabilize the pH values at the desired levels.

8. A process according to claim 1 wherein the fresh pasta dough which is steamed is a sheeted pasta, a sheeted/slitted pasta, or an extruded pasta all of which have been cut to the desired size.

9. A process according to claim 1 wherein the steaming of the fresh pasta dough is carried out using saturated steam or steam at atmospheric condition for a period of from about 1 to 5 minutes.

10. A process according to claim 1 wherein the steaming of the fresh pasta dough cooks or gelatinizes at least part of the surface of the pasta.

11. A process according to claim 1 wherein the fresh steamed pasta is a sheeted dough which is used to prepare longitudinal type pastas by partial drying followed by slitting and cutting.

12. A process according to claim 2 wherein the fresh steamed pasta is an extruded dough having the shape of the desired product and which is partially dried.

13. A process according to claim 1 wherein the partial drying of the pasta is performed by means of an impingement, forced air drier, an oven tunnel or a hot air tunnel at a temperature of from about 80° to 110° C. over a period of from about 1 to 10 minutes.

14. A process according to claim 1 wherein the pastas are packaged in food-grade packages, flexible plastics pouches, plastics or paperboard trays or glass jars.

15. A process according to claim 14 wherein the packaging of the pasta is conducted under modified atmospheric conditions and is carried out at ambient temperature.

16. A process according to claim 15 wherein the modified atmosphere comprises nitrogen or carbon dioxide or other noble gases either alone or in any mixture thereof.

17. A process according to claim 1 wherein the humectant is present in an amount of between about 2.5 and 5% so that the water activity is between about 0.8 and 0.87.

* * * * *

UNITED STATES PATENT AND TRADEMARK OFFICE
CERTIFICATE OF CORRECTION

PATENT NO. : 6,017,573

DATED : January 25, 2000

INVENTOR(S) : Janice M. BAKER et al.

It is certified that error appears in the above-identified patent and that said Letters Patent is hereby corrected as shown below:

Column 4, line 39 (claim 1, line 1): change "food" to --pasta product--.

Column 5, line 16 (claim 12, line 1): change "claim 2" to --claim 1--.

Signed and Sealed this

Third Day of October, 2000

Attest:

Q. TODD DICKINSON

*Attesting Officer*     *Director of Patents and Trademarks*